(12) United States Patent
Schwartz et al.

(10) Patent No.: US 10,118,117 B2
(45) Date of Patent: Nov. 6, 2018

(54) AIR FILTER WITH IMPROVED PERFORMANCE OR POSITIONING

(71) Applicant: Cummins Filtration IP, Inc., Columbus, IN (US)

(72) Inventors: Scott W. Schwartz, Cottage Grove, WI (US); Anthony Barreteau, Quimper (FR); Emmanuel Page, Tremeoc (FR)

(73) Assignee: Cummins Filtration IP, Inc., Columbus, IN (US)

( * ) Notice: Subject to any disclaimer, the term of this patent is extended or adjusted under 35 U.S.C. 154(b) by 371 days.

(21) Appl. No.: 14/895,181

(22) PCT Filed: Jun. 5, 2014

(86) PCT No.: PCT/US2014/041097
§ 371 (c)(1),
(2) Date: Dec. 1, 2015

(87) PCT Pub. No.: WO2014/197698
PCT Pub. Date: Dec. 11, 2014

(65) Prior Publication Data
US 2016/0114275 A1  Apr. 28, 2016

Related U.S. Application Data

(60) Provisional application No. 61/831,689, filed on Jun. 6, 2013.

(51) Int. Cl.
*B01D 46/00* (2006.01)
*B01D 46/24* (2006.01)
*B01D 46/52* (2006.01)

(52) U.S. Cl.
CPC ..... *B01D 46/0024* (2013.01); *B01D 46/2414* (2013.01); *B01D 46/521* (2013.01); *B01D 2265/024* (2013.01); *B01D 2271/027* (2013.01)

(58) Field of Classification Search
CPC ............ B01D 46/0024; B01D 46/2411; B01D 46/2414; B01D 46/521; B01D 2265/024; B01D 2271/027
See application file for complete search history.

(56) References Cited

U.S. PATENT DOCUMENTS

| 4,278,455 A | 7/1981 | Nardi |
| 4,314,832 A | 2/1982 | Fox |

(Continued)

FOREIGN PATENT DOCUMENTS

| DE | 199 33 205 | 1/2001 |
| DE | 1020111 20 387 | 6/2012 |

(Continued)

OTHER PUBLICATIONS

Extended European Search Report Issued for European Patent Application No. EP 14807947.8, dated Apr. 28, 2017, 15 pages.

(Continued)

*Primary Examiner* — Robert Clemente
(74) *Attorney, Agent, or Firm* — Foley & Lardner LLP

(57) ABSTRACT

Radial seal filter assemblies and filter cartridges are described. According to various embodiments, a filter includes a housing that extends along an axis between first and second axial ends. A primary filter element is disposed in the housing and axially extends between first and second axial ends that respectively are adjacent the first and second axial ends of the housing, the primary filter element has a hollow interior and a first axial length. A secondary filter element is disposed in the hollow interior of the primary filter element, the secondary filter element having a second axial length, the second axial length being longer than the first axial length of the primary filter element. The filter further includes an end cap disposed on the second axial end of the primary filter element.

7 Claims, 5 Drawing Sheets

(56) References Cited

U.S. PATENT DOCUMENTS

| | | |
|---|---|---|
| 5,800,584 A | 9/1998 | Hinderer et al. |
| 6,039,778 A | 3/2000 | Coulonvaux |
| 6,149,700 A | 11/2000 | Morgan et al. |
| 6,383,244 B1 | 5/2002 | Wake et al. |
| 6,391,076 B1 | 5/2002 | Jaroszczyk et al. |
| 6,398,832 B2 | 6/2002 | Morgan et al. |
| 6,416,561 B1 | 7/2002 | Kallsen et al. |
| 6,511,599 B2 | 1/2003 | Jaroszczyk et al. |
| 6,641,637 B2 | 11/2003 | Kallsen et al. |
| 6,641,742 B2 | 11/2003 | Prater et al. |
| 6,758,980 B2 | 7/2004 | Prater et al. |
| 6,902,598 B2 | 6/2005 | Gunderson et al. |
| 6,986,805 B2 | 1/2006 | Gieseke et al. |
| 7,097,694 B1 | 8/2006 | Jaroszczyk et al. |
| 7,314,558 B1 | 1/2008 | Jaroszczyk et al. |
| 7,323,106 B2 | 1/2008 | Jaroszczyk et al. |
| 7,413,588 B2 | 8/2008 | Holzmann et al. |
| 7,740,678 B2 | 6/2010 | Gunderson et al. |
| RE41,713 E | 9/2010 | Gunderson et al. |
| 7,828,870 B1 | 11/2010 | Rech et al. |
| RE42,174 E | 3/2011 | Gunderson et al. |
| 8,128,719 B1 | 3/2012 | Heckel et al. |
| 8,241,377 B2 | 8/2012 | Heckel et al. |
| 8,357,218 B2 | 1/2013 | Heckel et al. |
| 2004/0025827 A1* | 2/2004 | Davis ............... B01D 46/0004 123/198 E |
| 2004/0134171 A1 | 7/2004 | Scott et al. |
| 2005/0235617 A1 | 10/2005 | Read |
| 2009/0038276 A1 | 2/2009 | Gunderson et al. |

FOREIGN PATENT DOCUMENTS

| | | |
|---|---|---|
| EP | 2 243 537 | 10/2010 |
| WO | WO-84/04050 | 10/1984 |
| WO | WO-2012/116314 | 8/2012 |

OTHER PUBLICATIONS

International Search Report and Written Opinion issued for PCT Application No. PCT/US2014/041097, dated Dec. 3, 2014, 13 pages.

* cited by examiner

AIR FILTER WITH IMPROVED PERFORMANCE OR POSITIONING

CROSS REFERENCE TO RELATED APPLICATIONS

This application is a National Stage of PCT Application No. PCT/US2014/041097, filed Jun. 5, 2014, which claims priority to U.S. Provisional Patent Application No. 61/831,689 entitled "AIR FILTER WITH IMPROVED PERFORMANCE OR POSITIONING," filed Jun. 6, 2013. The contents of both applications are herein incorporated by reference in their entirety and for all purposes.

FIELD

The present disclosure relates to fluid filters, and more particularly to filters having a safety or secondary filter element in addition to a main or primary filter element.

BACKGROUND

Radial seal air filters are often used to filter air in air intake systems of devices, such as internal combustion engines. Conventional radial seal air filter systems include a filter cartridge having filter media arranged in a cylindrical manner and positioned between two end caps. The end caps often include polyurethane ("PU") seals that separate the clean side of the air filter from the dirty side of the air filter when the filter cartridge is received in an air filter system housing. The housing is generally a plastic or metal container that includes an air inlet (i.e., to provide air to be filtered to the filter media) and an air outlet (i.e., to supply filtered air to the device or component). Some conventional radial seal air filter cartridges are fitted over (i.e., inserted over when provided in the system housing) or include (i.e., have built-in) secondary filters within the space formed in the cylindrical air filter media. The secondary filter elements may be cantilevered within the housing.

Although PU is relatively inexpensive, a significant volume is required to close off the end cap on larger air filter elements. Because the PU is rubber-like for good sealability, the center area of top end cap is very "spongy" and can be easily depressed. Although this is acceptable from a functional perspective, it can be perceived as a "lower quality" feature by certain end users. Further, in some arrangements, the conventional air filters are received in a housing having a cover such that the entire filter cartridge is encased by the housing and the cover. In these arrangements, it may be difficult for a manufacturer or technician to verify that a filter cartridge is properly fitted within the housing (e.g., prior to shipping an assembled unit). Still further, filter cartridges fitted over secondary filter elements (e.g., a cantilevered secondary filter element) are easily positionable incorrectly with respect to the secondary filter element, which affects filter service operations. In some arrangements, the secondary filter is pushed off center by uncontrolled PU expansion during the installation process.

The following listed U.S. Patents provide background relating to similar filters that may suffer from the above described disadvantages. Each of the following listed U.S. Patents are incorporated herein by reference in entirety.

U.S. Pat. No. 6,149,700 discloses a filter element that includes pleated filter media having a plurality of pleats in a closed annular loop having an outer perimeter defined by a plurality of outer pleat tips, and an inner perimeter defined by a plurality of inner pleat tips, the closed annular loop having a hollow interior extending along an axis, wherein fluid to be filtered flows laterally through the filter media and flows axially in the hollow interior. The filter element has an axial flow passage along the axis and circumscribing the hollow interior and has a flow perimeter greater than the inner perimeter of the filter element defined by the inner pleat tips. An end cap of resilient compressible material at the axial end of the filter element bears radially between and is radially compressed between an outer liner and a flow tube at the enlarged flow passage.

U.S. Pat. No. 6,383,244 discloses a filter that has a housing extending along an axis between first and second axial ends, and has a closed loop primary filter element extending axially in the housing, and a closed loop safety filter element in the hollow interior of the primary filter element. A detent member engages and retains the end cap of the safety filter element independently of the primary filter element to retain the safety filter element in housing upon removal of the primary filter element from the housing.

U.S. Pat. No. 6,391,076 discloses a full flow fluid filter that has a housing extending axially along an axis, and a pleated filter element having a plurality of pleats in a closed loop annulus having an outer perimeter defined by a plurality of outer pleat tips, an inner perimeter defined by a plurality of inner pleat tips, and a hollow interior extending along the axis. Fluid flows substantially directly axially through the filter element, with minimal bending and change of direction, minimizing flow restriction.

U.S. Pat. No. 6,416,561 discloses an open flow fluid filter that has a pleated main filter element having a plurality of pleats in a closed loop having an outer perimeter defined by a plurality of outer pleat tips, and an inner perimeter defined by a plurality of inner pleat tips. The loop has a hollow interior extending along an axis. Fluid to be filtered flows through the main filter element from an upstream dirty side to a downstream clean side, and flows axially in the hollow interior. The main filter element has an axial flow passage extending along the axis and circumscribing the hollow interior and has a flow perimeter greater than the inner perimeter. A safety filter element downstream of the main filter element filters both the axial flow in the hollow interior and additional flow between the flow perimeter and the inner perimeter. A filter with additional flow is also provided.

U.S. Pat. No. 8,241,377 discloses a filter element that has a reinforcement band or ring along at least a portion of the perimeter thereof and performing a support function thereat preventing or minimizing damage upon attempted percussive cleaning of the filter element by service personnel striking the perimeter against an impact surface. Alternatively, a failure band or ring is provided along at least a portion of the perimeter and performs a designated failure function to a failure condition thereat upon attempted percussive cleaning, with the failure condition providing at least one of: a) an indication to service personnel that the filter element has been damaged and should not be re-installed; and b) a deformed condition preventing re-installation.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A first embodiment relates to a filter. The filter includes a housing that extends along an axis between first and second axial ends. The filter further includes a primary filter element that is disposed in the housing and axially extends between first and second axial ends that respectively are adjacent the first and second axial ends of the housing. The primary filter element has a hollow interior, and the primary filter element also has a first axial length. A secondary filter element is disposed in the hollow interior of the primary filter element. The secondary filter element has a second axial length, the second axial length being longer than the first axial length of the primary filter element. An end cap is disposed on the second axial end of the primary filter element.

A second embodiment relates to a filter. The filter includes a housing that extends along an axis between first and second axial ends. A primary filter element is disposed in the housing and axially extends between first and second axial ends that respectively are adjacent the first and second axial ends of the housing, wherein the primary filter element has a hollow interior. A secondary filter element is disposed in the hollow interior of the primary filter element. An end cap is disposed on the second axial end of the primary filter element, wherein the end cap extends into an opening formed through the second axial end of the housing.

A third embodiment relates to a filter. The filter includes a housing that extends along an axis between first and second axial ends. A filter media comprises a closed loop primary filter element that is disposed in the housing and axially extends between first and second axial ends that respectively are adjacent the first and second axial ends of the housing, wherein the primary filter element has a hollow interior. The filter includes a closed loop safety filter element is disposed in the hollow interior of the primary filter element. An end cap is disposed on the second axial end of the filter media, the end cap having a plurality of centering ribs that extend axially inwardly between the primary filter element and the safety filter element, wherein centering ribs center an end of the safety filter element in the hollow interior.

A fourth embodiment relates to a filter cartridge. The filter cartridge includes a primary filter media comprising a closed loop primary filter element arranged in a cylindrical manner with a hollow interior. A first end cap is coupled to a first end of the primary filter media, the first end cap including an opening. A second end cap is coupled to a second end of the primary filter media. A secondary filter media is received in the first end cap and covering the opening.

These and other features, together with the organization and manner of operation thereof, will become apparent from the following detailed description when taken in conjunction with the accompanying drawings, wherein like elements have like numerals throughout the several drawings described below.

DETAILED DESCRIPTION

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims. Each limitation in the appended claims is intended to invoke interpretation under 35 U.S.C. § 112, sixth paragraph only if the terms "means for" or "step for" are explicitly recited in the respective limitation.

Referring generally to the figures, various arrangements of radial seal air filter assemblies are shown. Each radial described radial seal air filter assembly includes an air filter cartridge having filter media positioned between two end caps. The filter cartridge is then received in an air filter housing.

Figure 1:
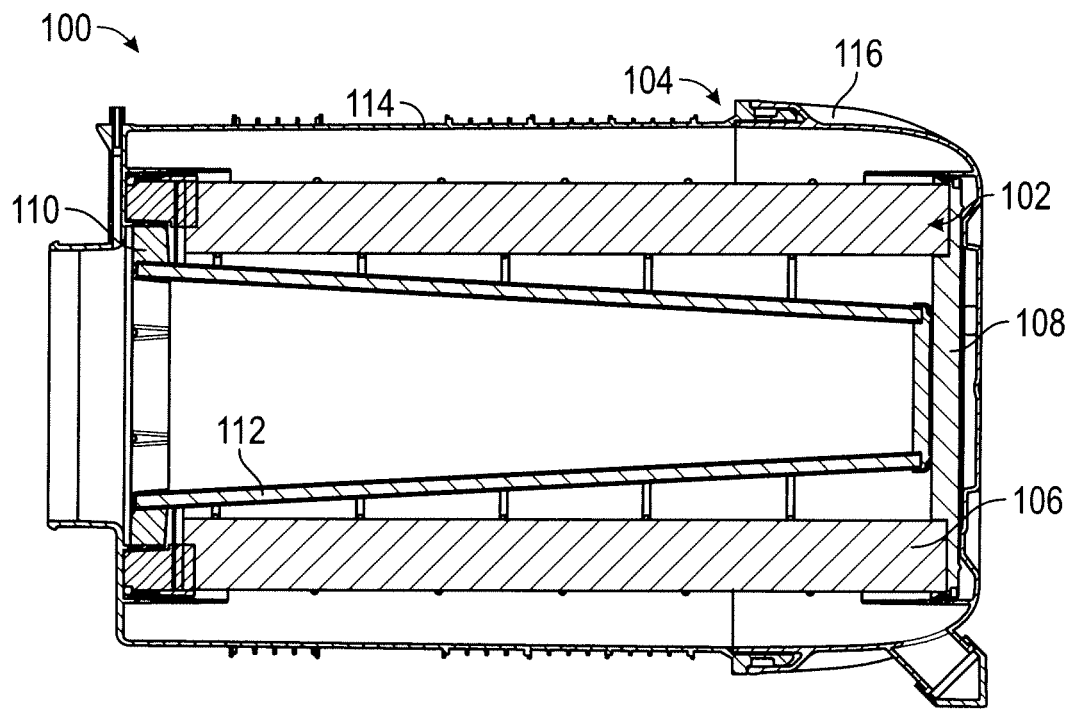
FIG. 1 shows a cross-sectional view of a radial seal air filter assembly 100 according to an exemplary embodiment.

Referring to FIG. 1, a cross-sectional view of a radial seal air filter assembly 100 is shown according to an exemplary embodiment. The filter assembly 100 includes a filter cartridge 102 positioned within a housing assembly 104 that extends along an axis between first and second axial ends. The filter cartridge 102 includes filter media 106 arranged in a cylindrical manner with a hollow interior. The filter media 106 is a closed loop primary filter element. The filter cartridge 102 is disposed in the housing assembly 104 and axially extends between first and second axial ends that respectively are adjacent to the first and second axial ends of the housing assembly 104. A first end of the filter media 106 is fitted with a first end cap 108 and a second end of the filter media 106 is fitted with a second end cap 110. The second end cap 110 is open and fitted over a secondary filter element 112. The secondary filter element 112 is a closed loop safety filter element. The first end cap 108 is closed. The first end cap 108 may include a part identifier (e.g., a serial number or a model number). The first end cap 108 and the second end cap 110 are made of polyurethane ("PU"). The housing assembly 104 includes a main body 114 and a cover 116. The cover 116 is removable to enable replacement and servicing of the filter cartridge 102. The cover 116 may be screwed or clamped to secure the cover 116 to the main body 114. When the cover 116 is secured to the main body 114 with an appropriate filter cartridge 102 within the housing assembly 104, the PU end caps 108 and 110 compress to form seals that seal the dirty side of the filter media 106 (i.e., the outside of the cylinder) from the clean side of the filter media 106 (i.e., the inside of the cylinder). In alternative arrangements, the first end cap 108 is sealed directly to the main body 114, which eliminates the need for the cover 116.

Figure 2:
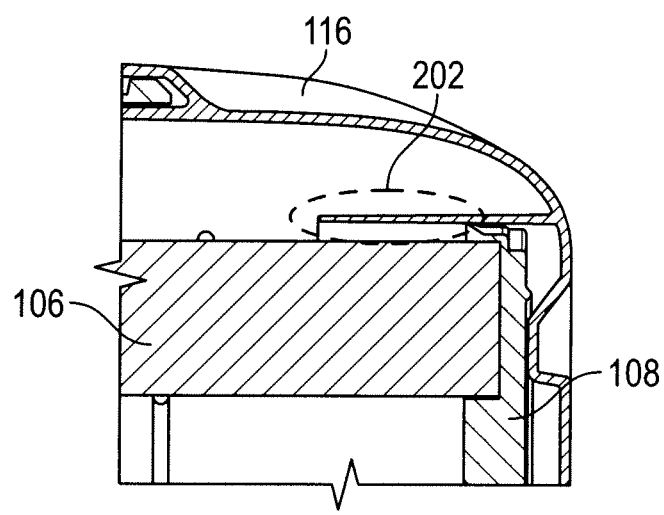
FIG. 2 shows a close-up cross-sectional view of the radial seal filter assembly of FIG. 1

Referring to FIG. 2, a close-up cross-sectional view of the radial seal filter assembly 100 is shown. During securing of the cover 116 to the main body 114, the PU seal may expand against a centering rib 202. The centering rib 202 helps prevent expansion of the PU seal in an unpredictable manner, which may cause the filter cartridge 102 and/or the secondary filter element 112 to become misaligned. The misalignment affects the air filter assembly's 100 restriction and dust loading capacity. The amount of PU used in producing the end cap 108, the PU flash, the end cap 108 depth, and the filter element 106 size can affect the amount of force required to secure the cover 116 to the main body 114.

Figure 3:
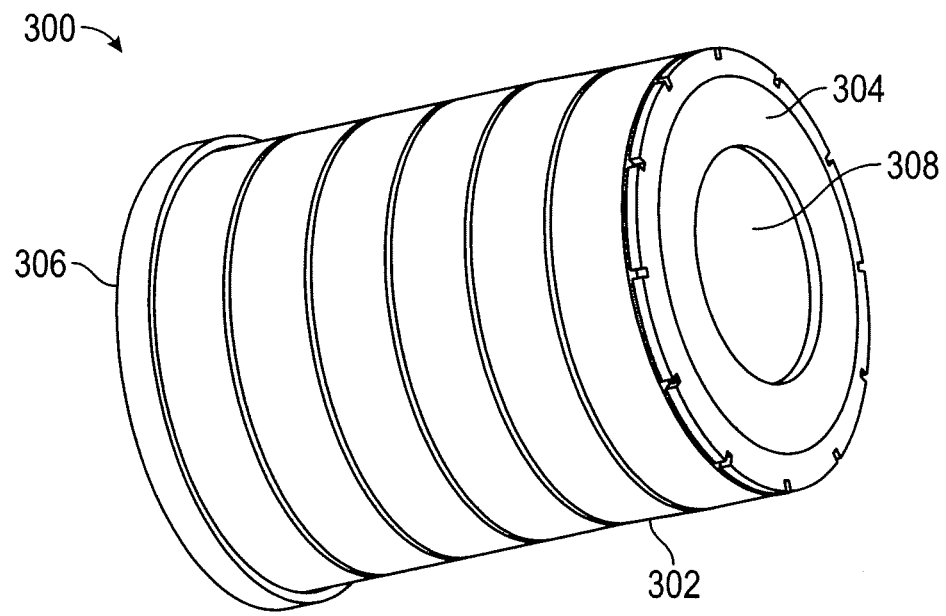
FIG. 3 shows a perspective view of a radial seal air filter cartridge according to an exemplary embodiment.
Figure 4:
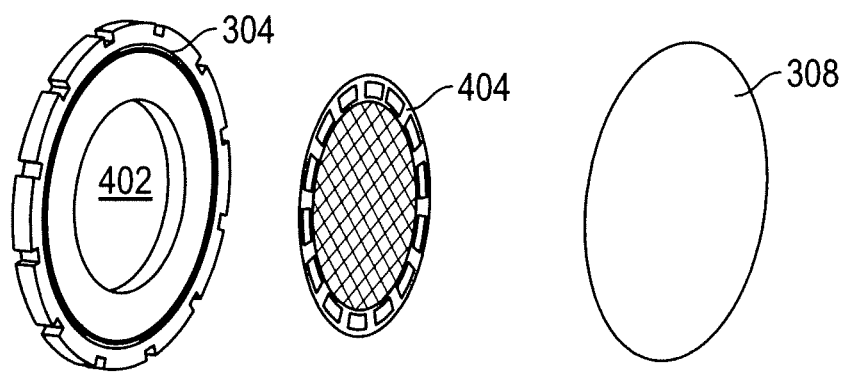
FIG. 4 shows an exploded view of a first end cap of the radial seal air filter cartridge of FIG. 3.

FIG. 3 provides a perspective view of a radial seal air filter cartridge 300 according to an exemplary embodiment. Filter cartridge 300 is similar to filter cartridge 102. Filter cartridge 300 includes filter media 302 arranged in a cylindrical manner with a hollow interior. The filter media 302 is a closed loop primary filter element. A first end of the filter media 302 is fitted with a first end cap 304 and a second end of the filter media 302 is fitted with a second end cap 306. The second end cap 306 is open similar to the second end cap 110 of the filter cartridge 102. The first end cap 304 and the second end cap 306 are made of PU. Alternatively, at least the first end cap is made from a hard polymer. Filter cartridge 300 differs from filter cartridge 102 in that the first end cap 304 includes an opening 402 as shown in FIG. 4) (e.g., the first end cap 304 is an open end cap) and a section secondary filter media 308 is received in the first end cap 304 and covers the opening. The secondary filter media 308 may be pleated or flat and of a round, square, or any other suitable shape. The filter cartridge 300 may be positioned over a secondary filter element within a housing in a similar manner as discussed above with respect to filter assembly 100. Accordingly, the filter cartridge 302 may be disposed in the housing assembly such that the filter cartridge 302 axially extends between first and second axial ends that respectively are adjacent to the first and second axial ends of the housing assembly.

Referring to FIG. 4, an exploded view of the first end cap 304 is shown. The first end cap 304 includes an opening 402. In some arrangements, the secondary filter media 308 is received between the first end cap 304 and a support grid 404 made of a material that is stiffer than the secondary filter media 308 (e.g., polymer, metal, etc.). The support grid 404 secure and support the secondary filter media 308 in the first end cap 304. In some arrangements, the support grid 404 is secured in the first end cap 304 through a snap-fit connection. In the arrangement shown in FIGS. 3 and 4, the filter cartridge 300 advantageously helps decrease the overall cost of filter cartridge 300 by requiring less PU and also less time to dispense the PU to form the first end cap 304. Additionally, the secondary filter media 308 provides additional filtering area, which decreases the pressure loss and increase the capacity of the filter cartridge 300. To accommodate the extra filtering capacity created by the secondary filter media 308, openings need to be created in the cover flange of the housing that receives the filter cartridge 300.

Figure 5:
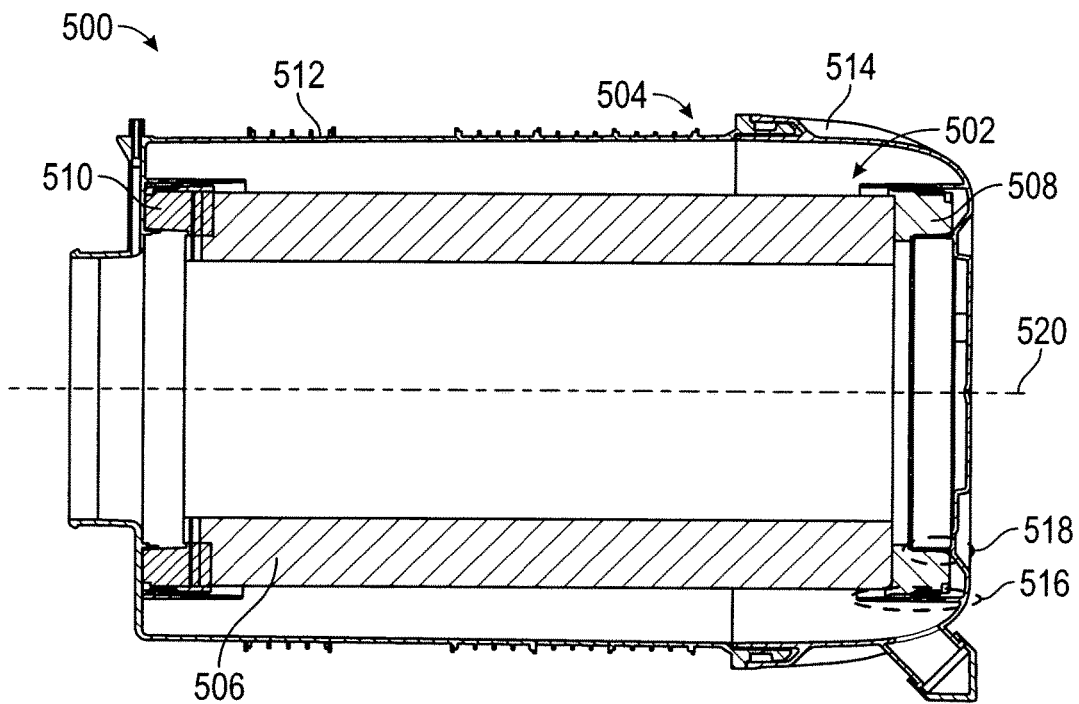
FIG. 5 shows a cross-sectional view of a radial seal air filter assembly according to an exemplary embodiment.

Referring to FIG. 5, a cross-sectional view of a radial seal air filter assembly 500 is shown according to an exemplary embodiment. Filter assembly 500 is similar to filter assembly 100. Filter assembly 500 includes a filter cartridge 502 received in a housing assembly 504 that extends along an axis between first and second axial ends. The filter cartridge 502 includes filter media 506 arranged in a cylindrical manner with a hollow interior. The filter media 506 is a closed loop primary filter element. The filter cartridge 502 is disposed in the housing assembly 504 and axially extends between first and second axial ends that respectively are adjacent to the first and second axial ends of the housing assembly 504. A first end of the filter media 506 is fitted with a first end cap 508 and a second end of the filter media 506 is fitted with a second end cap 510. The first end cap 508 and the second end cap 510 may be made of PU. Similar to the second end cap 110 of filter assembly 100, the second end cap 510 is open. However, filter assembly 500 differs from filter assembly 100 in that the first end cap 508 is also open.

The housing assembly 504 includes a main body 512 and a cover 514. The cover 514 is removable to enable replacement and servicing of the filter cartridge 102. The cover 514 may be screwed or clamped to secure the cover 514 to the main body 512. When the cover 514 is secured to the main body 512 with an appropriate filter cartridge 502 within the housing assembly 504, the PU end caps 508 and 510 compress to form seals that seal the dirty side of the filter media 506 (i.e., the outside of the cylinder) from the clean side of the filter media 506 (i.e., the inside of the cylinder). The cover 514 includes a cylindrical flange 516 that provides an axial sealing surface for the PU of the first end cap 508 to expand and seal against. The cylindrical flange 516 may include a raised surface 518 positioned radially inwardly of the axial sealing surface to provide additional surface area to form the seal. In some arrangements, the cover 514 includes a transparent or substantially transparent section that allows an operator to visually check for leaks downstream the filter cartridge 502 and misalignment of the filter cartridge 502 with respect to the housing assembly 504 without removing the filter cartridge 502 or the cover 514.

In some arrangements, the filter assembly 500 is symmetrical about a central axis 520. The symmetry of filter assembly 500 allows for an easier fit and a reduced filter manufacturing cost reducing a tooling cost for thermoformed molds used for creating the first end cap 508 as well as reducing the amount of PU used in creating the first end cap 508. Further, by reducing the amount of PU used for the first end cap 508, the filter assembly 500 solves the above-noted issue of uncontrollable PU expansion and distribution in middle of the filter assembly 500 (e.g., near the first end cap 508). This particular advantage becomes apparent in arrangements where a secondary filter element is included (e.g., as discussed below with respect to FIG. 6). Still further, filter assembly 500 allows for the possibility of operation using a single PU loop for the first end cap 508, which saves some operators and provides an easier fit. Since only the first end cap 508 is potted in PU, the filter cartridge 502 only makes one pass through the PU manufacturing line. In some arrangements, the first end cap 508 is made of a polymer material, which provides for an easier fit or installation within the housing assembly 504.

Figure 6:
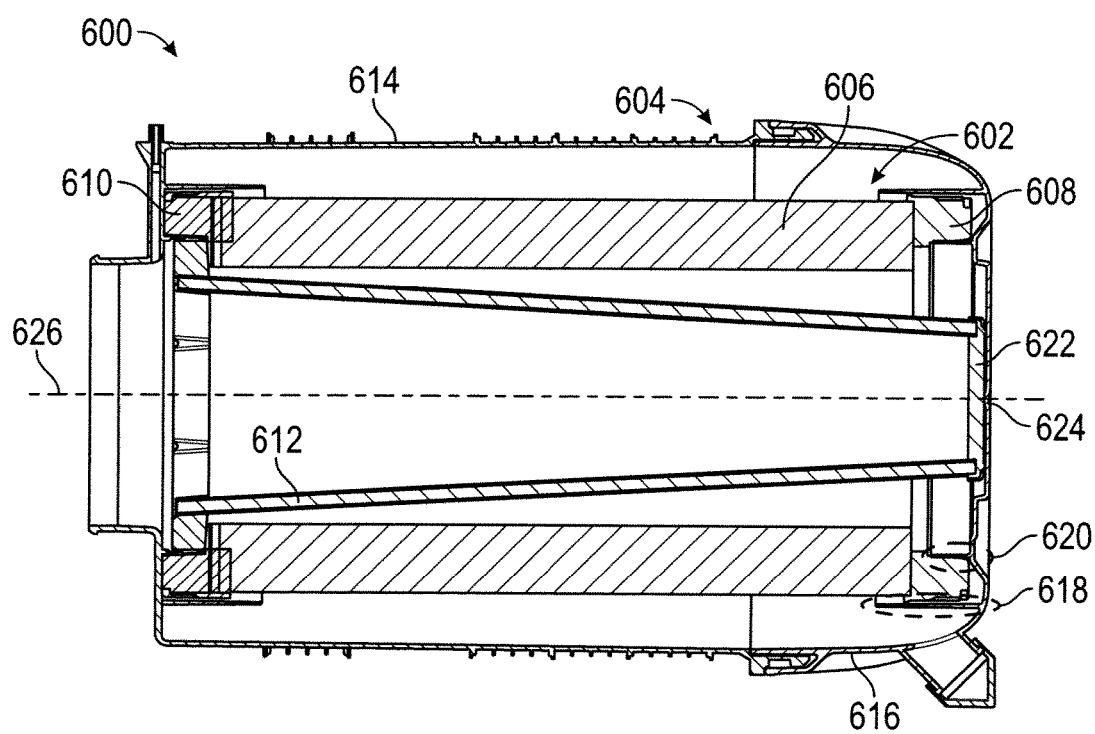
FIG. 6 shows a cross-sectional view of a radial seal filter assembly according to an exemplary embodiment.

Referring to FIG. 6, a cross-sectional view of a radial seal filter assembly 600 is shown according to an exemplary embodiment. Filter assembly 600 is similar to filter assembly 500. Filter assembly 600 includes a filter cartridge 602 within a housing assembly 604 that extends along an axis between first and second axial ends. The filter cartridge 602 includes filter media 606 arranged in a cylindrical manner with a hollow interior. The filter media 606 is a closed loop primary filter element. The filter cartridge 602 is disposed in the housing assembly 604 and axially extends between first and second axial ends that respectively are adjacent to the first and second axial ends of the housing assembly 604. A first end of the filter media 606 is fitted with a first end cap 608 and a second end of the filter media 606 is fitted with a second end cap 610. The first end cap 608 and the second end cap 610 may be made of PU. Similar to the end caps of filter assembly 500, the first and second end caps 608 and 610 are open.

Similar to the filter assembly 100 and different than the filter assembly 500, the filter assembly 600 includes a secondary filter element 612. The secondary filter element 612 is a closed loop safety filter element. In some arrangements, the filter cartridge 602 is fitted over the secondary filter element 612 during installation of the filter cartridge 602 within the housing assembly 604. In other arrangements, the secondary filter element 612 is part of or integral with the filter cartridge 602. As shown in FIG. 6, the secondary filter element 612 has a larger axial length than an axial length of the filter cartridge 602. The secondary filter element 612 is received within and extends through the opening of the first end cap 608. In other arrangements, the secondary filter element 612 has a smaller length than the filter cartridge 602.

The housing assembly 604 includes a main body 614 and a cover 616. The cover 616 is removable to enable replacement and servicing of the filter cartridge 602. The cover 616 may be screwed or clamped to secure the cover 616 to the main body 614. When the cover 616 is removably secured to the main body 614 with an appropriate filter cartridge 602 within the housing assembly 604, the PU end caps 608 and 610 compress to form seals that seal the dirty side of the filter media 606 (i.e., the outside of the cylinder) from the clean side of the filter media 606 (i.e., the inside of the cylinder). The cover 616 includes a cylindrical flange 618 that provides an axial sealing surface for the PU of the first end cap 608 to expand and seal against. The cylindrical flange 618 may include a raised surface 620 positioned radially inwardly of the axial sealing surface to provide additional surface area to form the seal. In some arrangements, the cover 616 includes a transparent or substantially transparent section that allows an operator to visually check for leaks downstream the filter cartridge 602 and misalignment of the filter cartridge 602 or the secondary filter element 612 with respect to the housing assembly 604 without removing the filter cartridge 602 or the cover 616. In the installed position, a secondary filter end cap 622 of the secondary filter element 612 may rest against the cover 616 when the cover 616 is in a closed position with respect to the main body 614. The cover 616 may include a first detent 624 that mates with a second detent of the secondary filter end cap 622 of the secondary filter element 612. The mating detents help retain the secondary filter element 612 in a properly aligned position when the cover 616 is in a closed position with respect to the main body 614. The secondary filter end cap 622 may be made of a rigid polymer.

In some arrangements, the filter assembly 600 is symmetrical about a central axis 626. The symmetry of filter assembly 600 allows for a reduced filter manufacturing cost reducing a tooling cost for thermoformed molds used for creating the first end cap 608 as well as reducing the amount of PU used in creating the first end cap 608. Further, by reducing the amount of PU used for the first end cap 608, the filter assembly 600 solves the above-noted issue of uncontrollable PU expansion and distribution in middle of the filter assembly 600 (e.g., near the first end cap 608). Since the first end cap 608 is open and the second filter element 612 is longer than the filter cartridge 602, the secondary filter element 612 extends through the first end cap 608 and rests against the cover 616 thereby eliminating interlocking and misalignment problems caused by the expansion of the PU. Still further, filter assembly 600 allows for the possibility of operation using a single PU loop for the first end cap 608, which saves some operators and provides an easier fit.

Still referring to FIG. 6, as discussed above, filter assembly 600 includes the secondary filter element 612 that is longer than the primary element (i.e., the filter cartridge 602). This arrangement is particularly advantageous in that the arrangement allows more space for the secondary filter element 612, which reduces the restriction of the filter assembly 600. The arrangement of filter assembly 600 also insures the use of proper replacement filter cartridges (e.g., filter cartridge 602) because a traditional filter cartridge having a closed first end cap would not properly fit over the longer secondary filter element 612.

Figure 7:
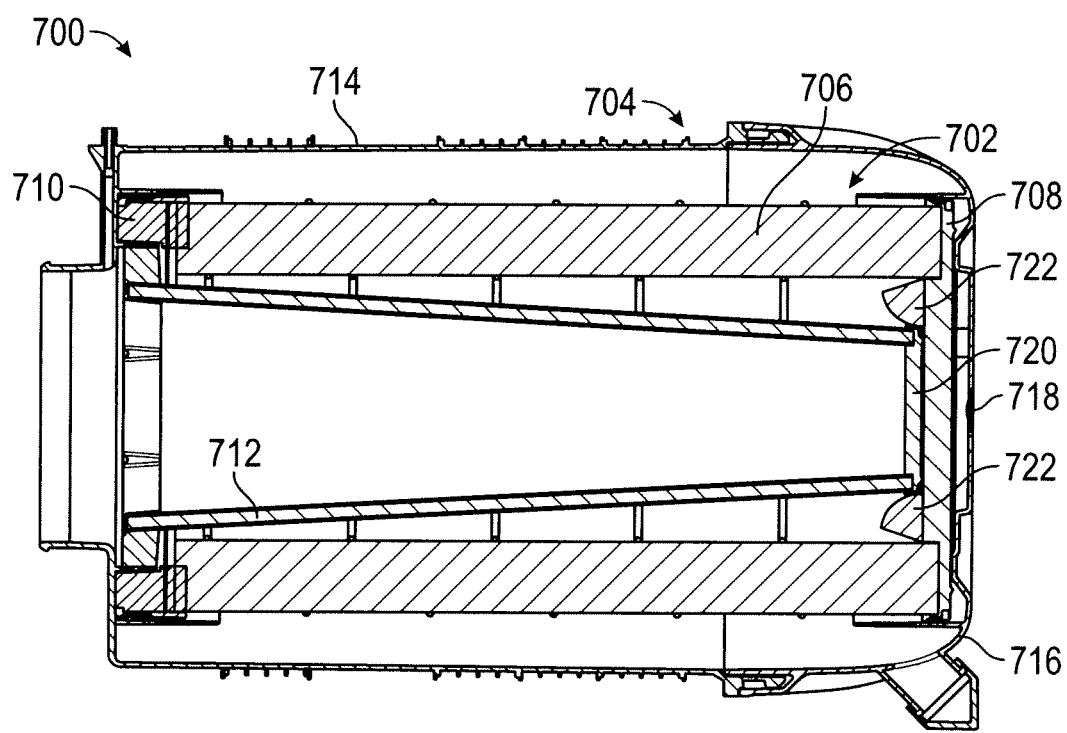
FIG. 7 shows a cross-sectional view of a radial seal air filter assembly according to an exemplary embodiment.

Referring to FIG. 7, a cross-sectional view of a radial seal air filter assembly 700 is shown according to an exemplary embodiment. The filter assembly 700 is similar to filter assembly 100. The filter assembly 700 includes a filter cartridge 702 positioned within a housing assembly 704 that extends along an axis between first and second axial ends. The filter cartridge 702 includes filter media 706 arranged in a cylindrical manner with a hollow interior. The filter media 706 is a closed loop primary filter element. The filter cartridge 702 is disposed in the housing assembly 704 and axially extends between first and second axial ends that respectively are adjacent to the first and second axial ends of the housing assembly 704. A first end of the filter media 706 is fitted with a first end cap 708 and a second end of the filter media 706 is fitted with a second end cap 710. The second end cap 710 is open and fitted over a secondary filter element 712. The secondary filter element 712 is a closed loop safety filter element. The first end cap 708 is closed. The first end cap 708 may include a part identifier (e.g., a serial number or a model number). Unlike filter assembly 100 in which both the first and second end caps 108 and 110 are made of PU, only the second end cap 710 is made of PU while the first end cap 708 is made of a hard polymer material. The housing assembly 704 includes a main body 714 and a cover 716. The cover 716 is removable to enable replacement and servicing of the filter cartridge 702. The cover 716 may be screwed or clamped to secure the cover 716 to the main body 714. When the cover 716 is secured to the main body 714 with an appropriate filter cartridge 702 within the housing assembly 704, the second end cap 710 compress to form a first seal and the first end cap 708 is pressed against the cover to form a second seal that each seal the dirty side of the filter media 706 (i.e., the outside of the cylinder) from the clean side of the filter media 706 (i.e., the inside of the cylinder).

As discussed above, the first end cap 708 is made of a hard polymer material, not PU. This the hard polymer material provides a rigid surface to receive a part label (e.g., a label including a part number) such that the part is easily identifiable. In the case of a PU end cap, the surface is spongy, which makes labeling difficult. The cover 716 may include a window or an opening 718 to allow a service technician to verify that the properly installed filter cartridge (e.g., filter cartridge 702) is received within the housing assembly 704 without removing the cover 716. The window or opening 718 in the cover 716 also allows a service technician or a user to easily identify an unwanted or improper filter element, such as a low-quality will-fit product or a counterfeit product. In some arrangements, a secondary element end cap 720 could be molded in a contrasting or bright color (e.g., yellow, red, etc.) to further indicate an absence of a properly installed filter cartridge when viewed through the window or opening 718 of the cover 716. The secondary element end cap 720 may be made of a rigid polymer. The cost of manufacturing the cover 716 is slightly reduced since the center portion of material is eliminated.

Still referring to FIG. 7, the polymer first end cap 708 would replace the current PU end cap used in conventional filter cartridges. The polymer material adds some cost to element. However, centering ribs 722 for the secondary filter element 712 may now be incorporated into the first end cap 708, increasing the functionality and robustness of the filter assembly 700. The centering ribs 722 taper back to the inside diameter of the filter media 706 so that even a secondary filter element that is installed at an extreme angle (e.g., in situations where the secondary filter element 712 does not cantilever approximately centered within the filter cartridge 702) will be pulled back into proper alignment. The centering ribs 722 insure proper alignment between the cover 716, the filter cartridge 702, and secondary filter element 712. Since the polymer first end cap 708 is much thinner, a slightly longer secondary element 712 (e.g., a secondary filter element that has a slightly longer length than a secondary filter element used in a system having a PU first end cap) may be used, which will reduce flow restriction slightly. Cover 716 installation will also be improved since the plastic end cap will slide easily against the plastic cover during rotation rather than grab like the PU.

In some arrangements, the filter media 706 of the filter cartridge 702 is potted directly into the cover 716. In this arrangement, the cover 716 serves as the first end cap and the need for a separate first end cap (e.g., first end cap 708) is eliminated. In this arrangement, the cost of the filter cartridge 702 increases, but the overall cost of the assembled filter assembly 700 is reduced.

Figure 8:
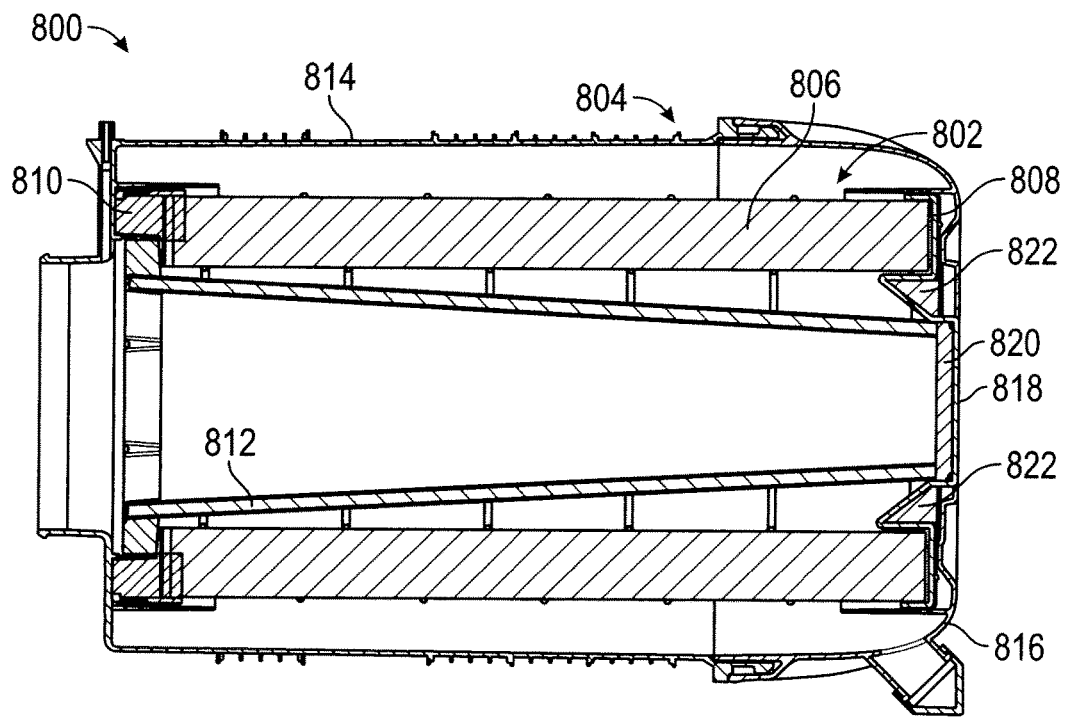
FIG. 8 shows a cross-sectional view of a radial seal air filter assembly according to an exemplary embodiment.
Figure 9:
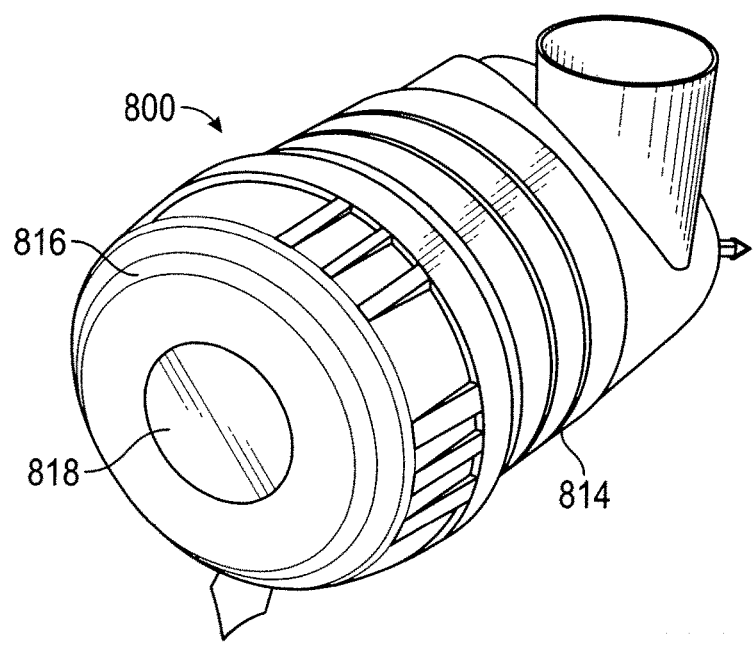
FIG. 9 shows a perspective view of the radial seal filter assembly of FIG. 8.

Referring to FIG. 8, a cross-sectional view of a radial seal air filter assembly 800 is shown according to an exemplary embodiment, and FIG. 9 provides for a perspective view of the radial seal filter assembly 800 of FIG. 8. Filter assembly 800 is substantially similar to filter assembly 700. The filter assembly 800 includes a filter cartridge 802 positioned within a housing assembly 804 that extends along an axis between first and second axial ends. The filter cartridge 802 includes filter media 806 arranged in a cylindrical manner with a hollow interior. The filter media 806 is a closed loop primary filter element. The filter cartridge 802 is disposed in the housing assembly 804 and axially extends between first and second axial ends that respectively are adjacent to the first and second axial ends of the housing assembly 804. A first end of the filter media 806 is fitted with a first end cap 808 and a second end of the filter media 806 is fitted with a second end cap 810. The second end cap 810 is closed and includes a socket to receive a secondary filter element 812 (e.g., the secondary filter element extends into the socket). The secondary filter element 812 is a closed loop safety filter element. In some arrangements, the first end cap 808 is closed. In other arrangements, the first end cap 808 is open. In such arrangements, the secondary filter element 812 is longer than the filter cartridge 802 such that an end of the secondary filter element 812 extends though the opening in the first end plate 808. The first end cap 808 may include a part identifier (e.g., a serial number or a model number). The second end cap 810 is made of PU and the first end cap 808 is made of a hard polymer material. The housing assembly 804 includes a main body 814 at a first axial end and a cover 816 at a second axial end. The cover 816 is removable to enable replacement and servicing of the filter cartridge 802. The cover 816 may be screwed or clamped to secure the cover 816 to the main body 814. When the cover 816 is secured to the main body 814 with an appropriate filter cartridge 802 within the housing assembly 804, the second end cap 810 compress to form a first seal and the first end cap 808 is pressed against the cover to form a second seal that each seal the dirty side of the filter media 806 (i.e., the outside of the cylinder) from the clean side of the filter media 806 (i.e., the inside of the cylinder).

As discussed above, the first end cap 808 is made of a hard polymer material, not PU. Thus, the hard polymer material provides a rigid surface to receive a part label (e.g., a label including a part number) such that the part is easily identifiable. In the case of a PU end cap, the surface is spongy, which makes labeling difficult. The cover 816 may include a window or an opening to allow a service technician to verify that the properly installed filter cartridge (e.g., filter cartridge 802) is received within the housing assembly 804 without removing the cover 816. A portion of the first end plate 808 may extend through the opening or window such that the first end plate 808 protrudes from the cover 816. The window or opening in the cover 816 also allows a service technician or a user to easily identify an unwanted or improper filter element, such as a low-quality will-fit product or a counterfeit product. In some arrangements, a secondary filter element end cap 820 could be molded in a contrasting or bright color (e.g., yellow, red, etc.) to further indicate an absence of a properly installed filter cartridge when viewed through the window or opening 818 of the cover 816. The secondary filter element end cap 820 may extend through the opening or window in the cover 816. The secondary filter element end cap 820 may be made of a rigid polymer. The cost of manufacturing the cover 816 is slightly reduced since the center portion of material is eliminated.

Still referring to FIG. 8, the polymer first end cap 808 would replace the current PU end cap used in conventional filter cartridges. The polymer material adds some cost to element. However, at least one centering rib 822 for the secondary filter element 812 may now be incorporated into the first end cap 808, increasing the functionality and robustness of the filter assembly 800. In some arrangements at least two centering ribs 822 are formed in the first end cap 808. The centering ribs 822 taper back to the inside diameter of the filter media 806 so that even a secondary filter element that is installed at an extreme angle (e.g., in situations where the secondary filter element 812 does not cantilever approximately centered within the filter cartridge 802) will be pulled back into proper alignment. The centering ribs 822 insure proper alignment between the cover 816, the filter cartridge 802, and secondary filter element 812 by guiding the secondary filter element 812 into the socket of the first end cap 808 during installation of the filter cartridge into the housing assembly 804. Since the polymer first end cap 808 is much thinner, a slightly longer secondary element 812 (e.g., a secondary filter element that has a slightly longer length than a secondary filter element used in a system having a PU first end cap) may be used, which will reduce flow restriction slightly. Cover 816 installation will also be improved since the plastic end cap will slide easily against the plastic cover during rotation rather than grab like the PU.

In some arrangements, the filter media 806 of the filter cartridge 802 is potted directly into the cover 816. In this arrangement, the cover 816 serves as the first end cap and the need for a separate first end cap (e.g., first end cap 808) is eliminated. In this arrangement, the cost of the filter cartridge 802 increases, but the overall cost of the assembled filter assembly 800 is reduced.

As noted above with respect to filter assemblies 700 and 800, the polymer material used for the first end caps of the respective filter cartridges provide certain benefits over the PU end caps. The polymer material provides a more premium, higher quality feel to customers. The polymer material provides a more robust filter cartridge design because the end cap is not flexible. Additionally, the polymer end cap provides an even, rigid surface for affixing a product label or molding a product identifier directly into the end cap. Still further, less force is required to rotate the covers to close the housing because the polymer material slides easier with respect to the polymer.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," etc.) are merely used to describe the orientation of various elements in the Figures. It should be noted that the orientation of various elements may differ according to other example embodiments, and that such variations are intended to be encompassed by the present disclosure.

In the present Detailed Description, certain terms have been used for brevity, clearness and understanding. No unnecessary limitations are to be inferred therefrom beyond the requirement of the prior art because such terms are used for descriptive purposes only and are intended to be broadly construed. The different air filtration cartridges, rectifiers and methods described herein may be used alone or in combination with other apparatuses and methods. Various equivalents, alternatives, and modifications are possible within the scope of the appended claims.

What is claimed is:

1. A filter comprising:
   a housing that extends along an axis between first and second axial ends, the housing comprising a main body and a cover removably secured to the main body in a closed position;
   a primary filter element that is disposed in the housing and axially extends between first and second axial ends that respectively are adjacent the first and second axial ends of the housing, the primary filter element has a hollow interior, the primary filter element has a first axial length;
   a secondary filter element disposed in the hollow interior of the primary filter element, the secondary filter element has a second axial length, the second axial length is longer than the first axial length of the primary filter element, the secondary filter element rests against the cover when the cover is in the closed position; and
   an end cap disposed on the second axial end of the primary filter element.

2. The filter of claim 1, wherein the end cap includes an opening and the secondary filter element extends through the opening.

3. The filter of claim 1, wherein the cover includes a cylindrical flange that provides an axial sealing surface for the end cap.

4. The filter of claim 1, wherein the cover includes a transparent or substantially transparent section that allows an operator to visually see into the filter.

5. The filter of claim 1, wherein the end cap is made of a hard polymer that is not polyurethane.

6. A filter comprising:
   a housing that extends along an axis between first and second axial ends, the housing comprising a main body and a cover removably secured to the main body in a closed position;
   a primary filter element that is disposed in the housing and axially extends between first and second axial ends that respectively are adjacent the first and second axial ends of the housing, the primary filter element has a hollow interior, the primary filter element has a first axial length;
   a secondary filter element disposed in the hollow interior of the primary filter element, the secondary filter element has a second axial length, the second axial length is longer than the first axial length of the primary filter element,
   the secondary filter element comprising a secondary filter end cap that rests against the cover when the cover is in the closed position; and
   an end cap disposed on the second axial end of the primary filter element.

7. The filter of claim 6, wherein the secondary filter end cap and the cover include mating detents that retain the secondary filter element in an aligned position when the cover is in the closed position.

* * * * *